US008255108B2

(12) United States Patent
Chinnadurai

(10) Patent No.: US 8,255,108 B2

(45) Date of Patent: Aug. 28, 2012

(54) DYNAMIC FILE SYSTEM CREATION FOR SCAN TOOLS

(75) Inventor: Manokar Chinnadurai, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 11/214,907

(22) Filed: Aug. 31, 2005

(65) Prior Publication Data

US 2007/0050106 A1 Mar. 1, 2007

(51) Int. Cl.
*G01M 17/00* (2006.01)

(52) U.S. Cl. ..................... 701/29.1; 701/29.6; 701/31.4; 701/31.5; 701/33.2; 701/34.2

(58) Field of Classification Search .................... 701/29, 701/35, 115, 1; 711/3, 4, 5, 104, 105, 113, 711/118, 119, 170; 369/27.01, 47.1, 47.15, 369/47.28, 27.32; 700/1–5; 702/80, 22, 702/23; 710/1, 62, 72, 74; 714/769
See application file for complete search history.

(56) References Cited

U.S. PATENT DOCUMENTS

| | | | | | |
|---|---|---|---|---|---|
| 4,887,204 | A | | 12/1989 | Johnson et al. | |
| 4,977,495 | A | * | 12/1990 | Stratton et al. | 711/113 |
| 5,197,026 | A | * | 3/1993 | Butler | 365/185.22 |
| 5,510,778 | A | * | 4/1996 | Krieter et al. | 340/7.54 |
| 5,519,853 | A | * | 5/1996 | Moran et al. | 713/400 |
| 5,602,995 | A | * | 2/1997 | Hendel et al. | 711/209 |
| 5,682,471 | A | * | 10/1997 | Billings et al. | 714/15 |
| 5,862,310 | A | * | 1/1999 | Crawford et al. | 358/1.18 |
| 5,961,626 | A | * | 10/1999 | Harrison et al. | 710/305 |
| 6,172,936 | B1 | * | 1/2001 | Kitazaki | 365/233.17 |
| 6,236,917 | B1 | * | 5/2001 | Liebl et al. | 701/32.8 |
| 6,345,283 | B1 | * | 2/2002 | Anderson | 707/205 |
| 6,526,340 | B1 | * | 2/2003 | Reul et al. | 701/29.3 |
| 6,662,087 | B1 | * | 12/2003 | Liebl et al. | 701/31.4 |
| 6,760,255 | B2 | * | 7/2004 | Conley et al. | 365/185.11 |
| 6,823,243 | B2 | | 11/2004 | Chinnadurai et al. | |
| 6,874,680 | B1 | | 4/2005 | Klaus et al. | |
| 6,993,643 | B2 | * | 1/2006 | Powell | 713/1 |
| 7,055,035 | B2 | * | 5/2006 | Allison et al. | 713/176 |
| 7,123,212 | B2 | * | 10/2006 | Acharya et al. | 345/2.1 |
| 7,181,572 | B2 | * | 2/2007 | Walmsley | 711/128 |
| 7,191,040 | B2 | * | 3/2007 | Pajakowski et al. | 701/1 |
| 7,203,709 | B2 | * | 4/2007 | Long et al. | 707/203 |
| 7,216,222 | B2 | * | 5/2007 | Holzmann | 713/1 |
| 7,302,323 | B2 | * | 11/2007 | Anderson et al. | 701/35 |
| 7,364,078 | B2 | * | 4/2008 | Raichle et al. | 235/462.01 |
| 7,434,042 | B2 | * | 10/2008 | Oguma | 713/2 |
| 7,562,162 | B2 | * | 7/2009 | Kreiner et al. | 710/11 |
| 7,571,035 | B2 | * | 8/2009 | Raichle et al. | 701/29.3 |
| 7,636,622 | B2 | * | 12/2009 | Underdal et al. | 701/29.1 |
| 2001/0029427 | A1 | * | 10/2001 | Nagaki et al. | 701/208 |

(Continued)

*Primary Examiner* — Jonathan M Dager
(74) *Attorney, Agent, or Firm* — Baker & Hostetler LLP

(57) ABSTRACT

An automotive diagnostic tool and method for accessing user configuration data and retrieving vehicle diagnostic data for read/write mode and storage. The diagnostic tool comprises a processor and a non-volatile memory coupled with the processor for storing data as continuously arranged data. The tool further comprises a main memory coupled with the processor for access and transfer of the data between the main memory and the non-volatile memory. The main memory is configured such that the continuously arranged data can be accessed from the non-volatile memory and stored in the main memory as the read/write data in a file system format. The main memory is further configured such that the read/write data can be transferred from the main memory to the non-volatile memory for storage as continuously arranged data.

10 Claims, 3 Drawing Sheets

U.S. PATENT DOCUMENTS

2002/0077779 A1* 6/2002 Liebl et al. .................... 702/183
2002/0077780 A1* 6/2002 Liebl et al. .................... 702/183
2002/0077781 A1* 6/2002 Liebl et al. .................... 702/183
2002/0193925 A1* 12/2002 Funkhouser et al. ........... 701/33
2003/0014521 A1* 1/2003 Elson et al. ................... 709/225
2004/0064226 A1* 4/2004 Lipscomb et al. .............. 701/29
2004/0064227 A1* 4/2004 Chinnadurai et al. .......... 701/29
2005/0043869 A1* 2/2005 Funkhouser et al. ........... 701/29
2005/0044311 A1* 2/2005 Lahiri et al. .................. 711/113
2005/0071561 A1* 3/2005 Olsen et al. ................... 711/118
2005/0138347 A1* 6/2005 Haverkamp et al. .............. 713/2
2005/0246497 A1* 11/2005 Mekhiel ......................... 711/118
2006/0004830 A1* 1/2006 Lora et al. ..................... 707/102
2006/0041349 A1* 2/2006 Chinnadurai et al. .......... 701/35
2006/0047902 A1* 3/2006 Passerini ....................... 711/114
2006/0132304 A1* 6/2006 Cabell ...................... 340/539.23
2006/0142906 A1* 6/2006 Brozovich et al. .............. 701/29
2006/0161822 A1* 7/2006 Furuta ............................. 714/52
2006/0287776 A1* 12/2006 Giles et al. ........................ 701/1
2006/0294556 A1* 12/2006 Chen et al. ...................... 725/89
2007/0100520 A1* 5/2007 Shah et al. ...................... 701/33
2008/0004764 A1* 1/2008 Chinnadurai et al. .......... 701/29

* cited by examiner

DYNAMIC FILE SYSTEM CREATION FOR SCAN TOOLS

FIELD OF THE INVENTION

The present invention relates generally to field of automotive diagnostics. More particularly, the present invention relates to a portable device designed to dynamically create a file system in RAM or main memory for fast read and write operation of applications and user data.

BACKGROUND OF THE INVENTION

Today, motor vehicles include various electronic control units mounted in the vehicle. The control units may control various systems and/or subsystems within the vehicle. For example, a control unit may control an engine, the transmission, brakes or the steering mechanism. These control units are typically coupled to a variety of sensors and/or actuators.

Handheld diagnostic tools have been utilized to troubleshoot faults associated with these control units. A typical diagnostic tool, for example, a scan tool, can include a microcontroller and an interface circuit to facilitate communication between the microcontroller and the control units in the vehicle. Each diagnostic tool can also include non-volatile internal or external memory, such as a plug-in module, that stores various diagnostic routines and/or vehicle diagnostic data or user configuration data to enable the tool to communicate with a vehicle's control unit as well as provide information to a user. The data being stored may include: fault codes that identify problem vehicle components; vehicle system data, for example, power train data, anti-lock break system (ABS) data, electrical system data, or sensor data, for example, vehicle temperature, revolutions per minute (rpm) data or pressure data.

Generally, diagnostic routines, user configuration data and the diagnostic data from the vehicle are stored in non-volatile memory having read and write privileges. Accordingly, the diagnostic tools may be configured with file systems to organize, segment and store the diagnostic routines or applications, user configuration data, and vehicle diagnostic data, for read and write capability. Although it is desirable to store the applications and data in read/write mode for later access, using file systems to store data can increase boot time to load a diagnostic tool's operating system and run its diagnostic applications. A high end or professional range scan tool can be configured to store, in addition to the data described above, vehicle specific data that is based, for example, on the make or model of the vehicle being examined. Moreover, the professional range scan tool can include embedded operating systems with file system support. Given the configuration of these high end scan tools, there exists an overhead or consumption of computer resources upon power up of the device, thus increasing boot time. This boot time can be as long as two minutes. This boot delay can therefore make the professional range scan tool unattractive for quick system checks, for example, to make a diagnostic code reading from a vehicle. As a result, automotive technicians will generally use a low end scan tool having limited capability, for example, a scan tool having only code reading capability in order to perform the quick system check.

An alternative technique to reduce boot time is to configure a scan tool such that the operating system and application file system is mounted in read only mode. However, the technique inhibits storing user data, including user configuration data, and retrieved vehicle diagnostic data in a file system for read/write mode and later access.

Accordingly, it is desirable to provide a method and apparatus for the storage of user configuration data and retrieved vehicle diagnostic data with read/write capability in a diagnostic tool having a boot time that is minimized or otherwise fast using a read-only file system. Moreover, it is desirable to provide such a diagnostic tool that is compatible with the operating features of a high end diagnostic tool.

SUMMARY OF THE INVENTION

The foregoing needs are met, to a great extent, by the present invention, wherein in one aspect an apparatus and method are that in some embodiments provides for a diagnostic tool having high end diagnostic capability with read/write operations and in which the boot time of the tool is minimized.

In accordance with one embodiment of the present invention, a diagnostic tool for accessing user configuration data and retrieving vehicle diagnostic data for read/write mode and storage comprises a processor and a first non-volatile memory coupled with the processor for storing data. The first non-volatile memory can be configured such that the data is stored as continuously arranged data. A main memory can be coupled with the processor for access and transfer of the data between the main memory and the first non-volatile memory. The main memory can be configured such that continuously arranged data can be accessed from the first non-volatile memory and stored in the main memory as read/write data. The main memory can be further configured such that the read/write data can be transferred from the main memory to the first non-volatile memory for storage as continuously arranged data. In another embodiment, the main memory can include a temporary storage area for storing read/write data in the main memory. In one embodiment, the main memory includes RAM and a file system in which the file system can be configured for accessing the continuously arranged data from the first non-volatile memory and storing the data as read/write data in the main memory. Moreover, the main memory can be a RAMDISK.

In yet another embodiment, the diagnostic tool can further comprise a second non-volatile memory having at least one application and an operating system. The operating system can be configured to dynamically create the file system. In addition, the operating system can be configured to use the file system to store the data as read/write data in the main memory. The operating system can be further programmed for converting and transferring the read/write data as continuously arranged data to the first non-volatile memory for storage therein.

In accordance with another embodiment of the present invention provides a method of retrieving, updating and storing vehicle data on an automotive diagnostic tool. The method comprises booting an operating system in read only mode and creating a file system in a main memory of the diagnostic tool using the operating system. In addition, the method comprises accessing the vehicle data being stored on a non-volatile memory as continuously arranged data. The method further comprises transferring the continuously arranged data from the non-volatile memory to a temporary storage area of the main memory such that the vehicle data can be stored as read/write data. The method can further comprise accessing the vehicle data from the temporary storage area as read/write data using the operating system and the at least one application wherein the operating system and the at least one application access the data using the file system of the main memory.

In yet another embodiment according to the present invention, a diagnostic tool for accessing, writing and storing data comprising first storage means for storing at least one application, an operating system in read only mode, and processing means for executing the at least one application and the operating system. The processing means can be coupled to the first storing means. The tool can further comprise a second storage means for storing data as continuously arranged data. The second storage can be coupled to the processing means. In addition, the tool can comprise memory means for accessing continuously arranged data in read/write mode. The memory means can be coupled to the processing means. In one embodiment, the first storage means can include operating means for creating file means in the memory means for accessing continuously arranged data from the second storage means and storing the data in the memory means as read/write data.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
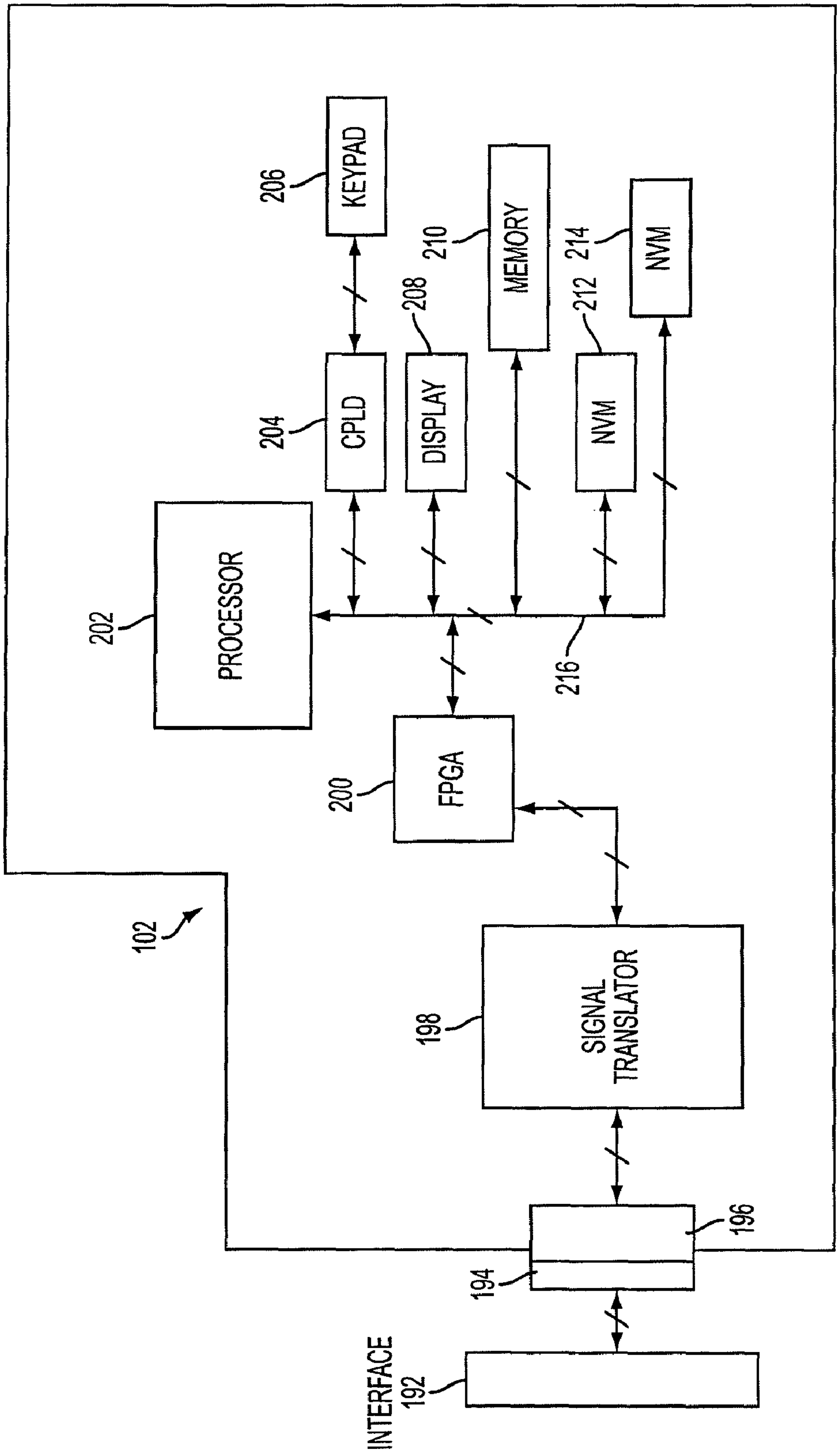
FIG. 1 PRIOR ART
FIG. 1 is an illustrative block diagram of the functional units of a device in accordance with an embodiment of the present invention.

The invention will now be described with reference to the drawing figures, in which like reference numerals refer to like parts throughout. An embodiment in accordance with the present invention provides an automotive diagnostic tool or scan tool device and method for accessing user configuration data and retrieving vehicle diagnostic data for read/write mode and storage. The diagnostic tool comprises a microprocessor, RAM, and a non-volatile memory coupled with vehicle communication protocol interface circuits. The tool further comprises a main memory coupled with the processor for access and transfer of the data between the main memory and the non-volatile memory. The main memory is configured such that the continuously arranged data can be accessed from the non-volatile memory and stored in the main memory with the file system as read/write data. The main memory is further configured such that the read/write data can be transferred from the main memory to the non-volatile memory for storage as continuously arranged data.

Shown in FIG. 1 is an illustrative schematic diagram of an automotive diagnostic tool or scan tool device 102 in accordance with an embodiment of the present invention. Device 102 can be configured to interface with an on-board diagnostic (OBD) system including, for example, a vehicle control module of a vehicle. In one embodiment, device 102 can include a selectable multiple protocol interface 200 coupled to a microprocessor or processor 202. The selectable multiple protocol interface 200 can be, for example, a field programmable gate array (FPGA). The FPGA 200 can be coupled to a selectable signal translator 198. The translator 198 can be coupled to a motor vehicle communication interface 192 through a connector 196 and an existing vehicle diagnostic connector 194 by an external cable (not shown) that is typically motor vehicle dependent. Alternatively, the device 102 can also be implemented within a diagnostic system that includes a wireless communication module and a remote station for communication with the OBD system. The FPGA 200 can transmit to and receive signals from a motor vehicle control unit through the translator 198. The translator 198 can condition signals received from the control unit (control unit information) to a conditioned signal compatible with diagnostic tool 102. Circuitry for translating a signal from one voltage level to another is well known to those of ordinary skill in the art.

The FPGA 200 can be coupled to the processor 202 through various address, data and control lines of a system bus 216 to provide a multiple communication protocol interface between the processor 202 and the motor vehicle control unit. In this manner, the processor 202 can read error codes from the control unit and provide test signals to the control unit, such that various actuators and/or sensors within the motor vehicle can be tested and test data can be collected. The processor 202 can be, for example, a MPC823 processor manufactured by Motorola Corporation. The processor 202 can also be further coupled to or in communication with a display 208 and to a complex programmable logic device (CPLD) 204, through the system bus 216. The CPLD 204 provides decoding logic for keypad 206 and also provides glue-logic for various other interfacing tasks. The processor 202 can be programmed to provide output to a user through display 208 and receive input from the user through a keypad 206. The processor 202 can be coupled to or in communication with main memory 210, and the non-volatile memory 212 and 214 to launch available operating systems, to execute available diagnostic programs or applications, to read/write, collect and store vehicle data for later reference, and to communicate with selected motor vehicle control units.

Figure 2:
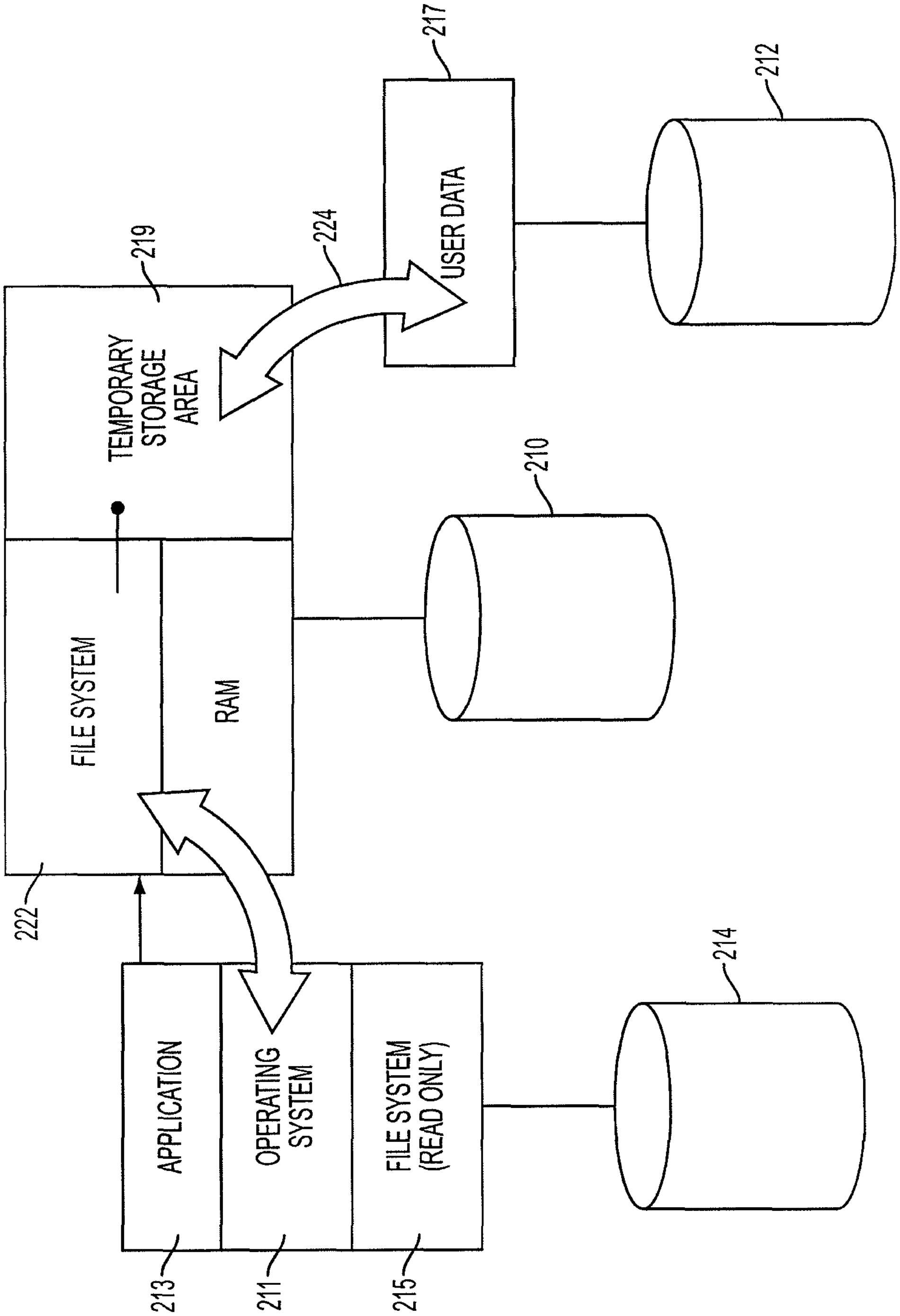
FIG. 2 is an illustrative memory system of the device of FIG. 1 in accordance with an embodiment of the present invention.

More specifically, the diagnostic tool 102 can include a first non-volatile memory 212, a second non-volatile memory 214 and a memory subsystem or main memory 210 coupled to or in communication with one another and the processor 202 along system bus 216. Shown in FIG. 2 is a memory diagram of the diagnostic tool 102. The first non-volatile memory 212 can be configured to provide storage for vehicle or user data 217, such as for example, diagnostic trouble codes (DTCs), test measurement data, sensor reading data, vehicle module or component data, or other vehicle parameter data. The first non-volatile memory 212 can be populated with user data 217 using the data collection capabilities of the scan tool 10 and the storage method of the present invention as described in further detail below. Alternatively, the non-volatile memory 212 can be populated with manufacturer provided data and stored as the user data 217. The first non-volatile memory 212 can be configured so as to store user data 217 without a file system or so as to be unformatted memory. More specifically, first non-volatile memory 212 can be configured to store user data 217 as continuously or linearly arranged data as can be appreciated by those of ordinary skill in the art. First non-volatile memory 212 can also be further or alternatively configured to store updated programs, for example, operating system modules or diagnostic applications. In one embodiment, first non-volatile memory 212 can be configured as an external non-volatile memory 212 to device 102 such as, for example, a compact flash card or other flash memory device.

Second non-volatile memory 214 can provide storage for one or more of boot code, an operating system 211, diagnostic applications 213, an associated file system 215, driver install procedures 226 (not shown) and other applications and data such as, for example, self-diagnostic routines, various drivers and field programmable gate array (FPGA) images. In one embodiment, the operating system 211, the application 213 and the file system 215 can be stored or mounted in the non-volatile memory 214 in read-only mode so as to enable a more rapid boot time for device 102. Operating systems known in the art that can be configured for storage on the second non-volatile memory 214 include, for example, NEMISYS, TASK MASTER, and SOLARITY operating systems distributed by SPX Service Solutions, Inc. In addition, second non-volatile memory 214 can be configured as internal non-volatile memory 214 of device 102. Internal non-volatile memory 214 can be an electrically erasable programmable read-only memory (EEPROM) or electronic memory. Although device 102 is shown with the external non-volatile memory 212 and the internal non-volatile memory 214, it is to be understood that device 102 can be provided with additional separable non-volatile memory, as is needed, to suit various diagnostic applications. Moreover, although the first non-volatile memory 212 and the second non-volatile memory 214 are shown as two discrete elements in FIGS. 1 and 2, it is to be understood that the first non-volatile memory 212 and the second non-volatile memory 214 can be a single memory device partitioned such that part of the device is configured as first non-volatile memory 212 and another part of the device is configured as the second non-volatile memory 214. For example, a part of the device can be unformatted so as to store data as continuously arranged or linear data, and another portion of the device can be configured with a operating system and an application in read-only mode with a corresponding file system.

The main memory 210 can include an application dependent amount of main memory or RAM, i.e., dynamic random access memory (DRAM). Main memory 210 can further include read-only memory (ROM). In one embodiment, main memory 210 is configured as RAM with a file system 222 so as to form a RAMDISK. The file system 222 of the RAMDISK 210 can be dynamically created to provide file system support to the operating system 211 and the application 213. More specifically operating system 211 and the application 213 can be programmed so as to perform a read/write operation within RAMDISK 210 using the file system 222.

The operating system 211 and applications 213 can be configured or programmed for read/write and storage operations of user data 217 of the first non-volatile memory 212 within RAMDISK 210. Upon power up of the device 102 and the rapid boot of the operating system 211, the operating system 211 or another separate application can dynamically create the file system 222 in the RAMDISK 210. More specifically, the operating system 211 or other application can be configured to dynamically create the file system 222 in the main memory 210 using file creation techniques so as to form the RAMDISK 210. The device 102 can be further configured to perform a service operation 224 to transfer the user data 217 between the non-volatile memory 212 and the RAMDISK 210. More specifically, the operating system 211 or a separate application can be programmed or configured to perform the service operation 224 employing data transfer techniques to transfer the user data 217 between the non-volatile memory 212 and a temporary storage area 219 of the RAMDISK 210. The operating system 211 and the application 213 can be configured or programmed to use the file system 222 to operate on, organize, track and store the user data 217 as read/write data files in the temporary storage area 219. The read/write operations can include a change to any initially collected user data 217, such as for example, user configuration data or alternatively, can include the initial collection of data readings by the scan tool 10, such as for example, vehicle diagnostic data, to be stored as user data 217.

The above described configuration can overcome the volatility of storing data in the RAMDISK 210 by creating, from the perspective of the application 213, a data abstraction layer which provides for storage of the user data 217 with read/write capability. More specifically, the data abstraction layer can be provided where the user data 217 is stored in the temporary storage are 219 of the RAMDISK 210. To an application supported by file system 222 running on diagnostic tool 10 such as, for example, application 213, the user data 217 appears to be available for read/write operations.

Figure 3:
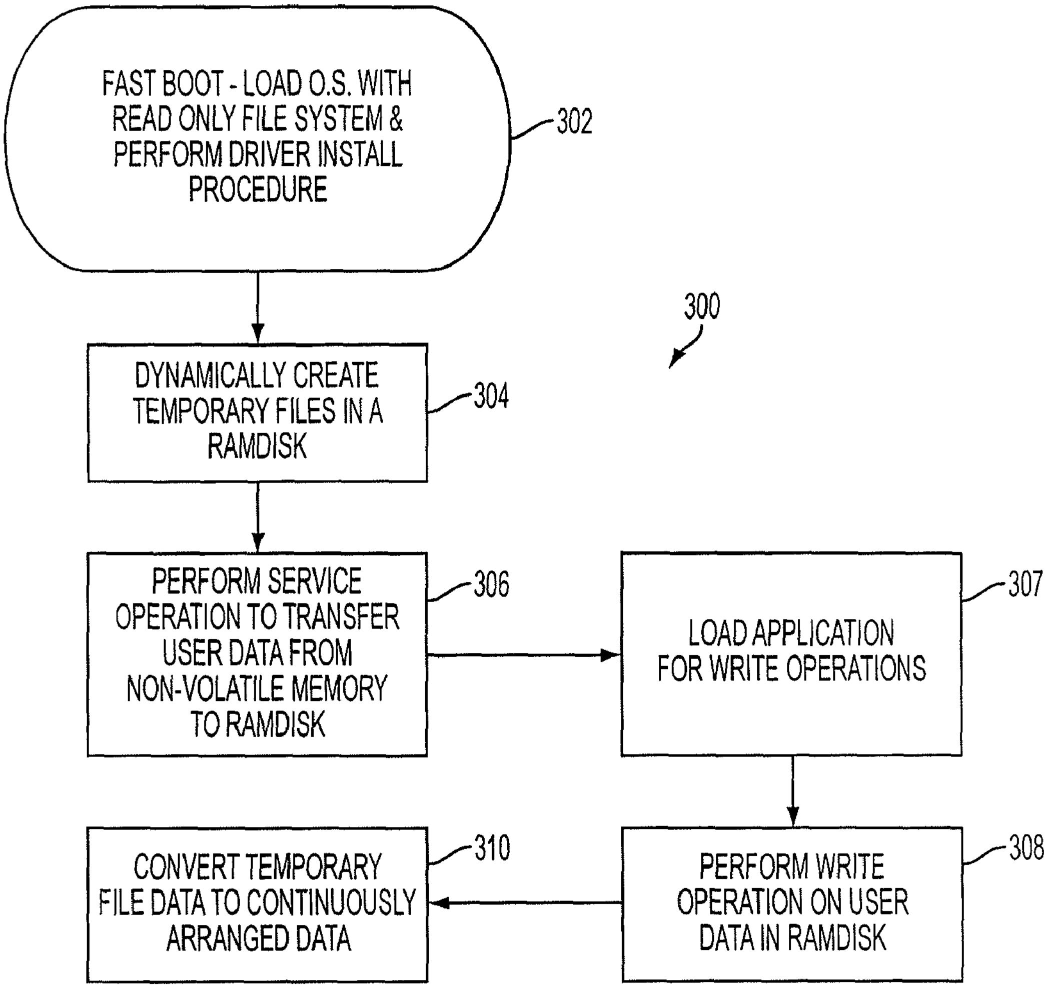
FIG. 3 is a flow chart showing the steps of a method in accordance with an embodiment of the invention.

Shown in FIG. 3 is a flow chart of steps for method of operation of diagnostic device 102 to access, read/write or update and store user data 217 in accordance with an embodiment of the present invention. Upon power up of device 102, the process 300 includes boot step 302 to provide for rapid or reduced boot time of the operating system 211 using the file system 215 mounted in read-only mode. The operating system 211 or a separate program can perform file creation step 304 to dynamically create the file system 222 in the RAMDISK 210. A service operation step 306 can be provided to perform service operation 224 to transfer the continuously arranged user data 217 from the non-volatile memory 212 to the temporary storage area 219 of the RAMDISK 210. A launch step 307 can be provided to launch application 213 for read and write of the user data 217. Accordingly, a write step 308 can be performed in which the operating system 211 and the application 213 can access and execute write operations on the user data 217 in the temporary storage area 219 using the file system 222 of the RAMDISK 210. The write step 308 can include write over of any previously stored user data 217, and alternatively and/or in addition to, the write step 308 can include the read/write of initially collected data readings by the scan tool 10 to be stored as the user data 217. More specifically, the file system 222 supports the read/write operations 308 of the operating system 211 and the application 213 upon the user data 217 by organizing and/or tracking the user data. In one embodiment of the method, immediately following each read/write operation 308, the temporarily stored read/write data 217 can be converted to continuously arranged or linearly arranged user data 217 at conversion step 310. Burst mode and memory transfer operations can be employed for high-speed transfer of the user data 217 between the RAMDISK 210 and the non-volatile memory 212. Storage of the updated and transferred user data 217 in the non-volatile memory 212 as continuously arranged data provides for later access of the user data 217.

Although the device 102 and its method of storing and accessing data is useful in automotive diagnostics it can also be used for devices employing computer memory. The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diagnostic tool for accessing user configuration data and retrieving vehicle diagnostic data for read/write mode and storage, the diagnostic tool comprising:

a processor to process vehicle diagnostic data;

a first non-volatile memory coupled with the processor for storing data, the first non-volatile memory being configured such that the data is stored as continuously arranged data, wherein the first non-volatile memory is without a file system;

a second non-volatile memory having at least one application, an operating system, and a first file system stored thereon in read-only mode to reduce boot time, wherein the operating system is configured to dynamically create a second file system; and a main memory coupled with the processor for access and transfer of the data between the main memory and the first non-volatile memory, the main memory being configured such that continuously arranged data can be accessed from the first non-volatile memory and stored in the main memory as read/write data, the main memory being further configured such that the read/write data can be transferred from the main memory to the first non-volatile memory for storage as continuously arranged data, wherein the main memory includes RAM and the second file system, the second file system being configured for accessing the continuously arranged data from the first non-volatile memory and storing the data as read/write data in the main memory.

2. The diagnostic tool of claim 1, wherein the main memory includes a temporary storage area for storing read/write data in the main memory.

3. The diagnostic tool of claim 1, wherein the main memory is a RAMDISK.

4. The diagnostic tool of claim 1, wherein the operating system is configured to transfer the data between the main memory and the non-volatile memory.

5. The diagnostic tool of claim 4, wherein the operating system is configured to use the second file system to store the data as read/write data in the main memory, the operating system being further programmed for converting and transferring the read/write data as continuously arranged data to the first non-volatile memory for storage therein.

6. The diagnostic tool of claim 1, wherein the second memory is configured to perform a service operation to transfer the data between the temporary file and the second non-volatile memory.

7. The diagnostic tool of claim 6, wherein the second memory is configured to perform the service operation using burst mode and memory transfer operations.

8. The diagnostic tool of claim 1, wherein the main memory and the first non-volatile memory are configured to create the second file system in the main memory to store the data as read/write data in the main memory and to transfer the read/write data to the first non-volatile memory for storage as continuously arranged data.

9. A diagnostic tool for accessing, writing, and storing data, the diagnostic tool comprising:

first storage means for storing at least one application, an operating system, and a first file system thereon in read-only mode to reduce boot time;

processing means for executing the at least one application and the operating system in order to process vehicle diagnostic data, the processing means being coupled to the first storage means, wherein the operating system is loaded in read only mode;

second storage means for storing data as continuously arranged data, the second storage means being coupled to the processing means, wherein the second storage means is without a file system; and memory means for accessing continuously arranged data in read/write mode, the memory means being coupled to the processing means, wherein the operating system is configured to dynamically create a second file system in the memory means for accessing continuously arranged data from the second storage means and storing the data in the memory means as read/write data.

10. The diagnostic tool of claim 9, wherein the operating system is configured to transfer the read/write data from the memory means as continuously arranged data to the second storage means for storage therein.

* * * * *